United States Patent [19]

Newswanger

[11] Patent Number: 5,291,317

[45] Date of Patent: Mar. 1, 1994

[54] HOLOGRAPHIC DIFFRACTION GRATING PATTERNS AND METHODS FOR CREATING THE SAME

[75] Inventor: Craig Newswanger, Ventura, Calif.

[73] Assignee: Applied Holographics Corporation, Oxnard, Calif.

[21] Appl. No.: 552,258

[22] Filed: Jul. 12, 1990

[51] Int. Cl.$^5$ .......................... G02B 5/18; G02B 5/32; G03H 1/26
[52] U.S. Cl. ................................. 359/15; 359/22; 359/30; 359/567; 359/572; 359/575
[58] Field of Search ............. 359/1, 22, 3, 15, 25, 359/566, 567, 558, 569, 572, 575, 28, 30

[56] References Cited

U.S. PATENT DOCUMENTS

| | | | |
|---|---|---|---|
| 3,567,561 | 3/1971 | Wood | 359/567 |
| 3,947,105 | 3/1976 | Smith | 353/121 |
| 4,036,552 | 7/1977 | Lee et al. | 359/515 |
| 4,455,061 | 6/1984 | Case | 359/15 |
| 4,547,037 | 10/1985 | Case | 359/15 |
| 4,568,141 | 2/1986 | Antes | 359/572 |
| 5,032,003 | 7/1991 | Antes | 359/567 |
| 5,056,880 | 10/1991 | Barbanell | 359/25 X |
| 5,058,992 | 10/1991 | Takahashi | 359/567 |

FOREIGN PATENT DOCUMENTS 0240262 10/1987 European Pat. Off. .
90/07133 6/1990 PCT Int'l Appl. .

*Primary Examiner*—Bruce Y. Arnold
*Assistant Examiner*—David R. Parsons
*Attorney, Agent, or Firm*—Blakely, Sokoloff, Taylor & Zafman

[57] ABSTRACT

Methods for creating a plurality of holographic diffraction grating patterns in a raster scan fashion. In accordance with the method, the desired pattern is made up of a large plurality of individual spots, each spot comprising a holographic diffraction grating of a predetermined grating spacing and angular orientation for that spot. Variation of the angular orientation and/or grating spacing between spots and/or groups of spots provide the desired holographic effect. The spot locations may vary as desired, including locations drawing out a desired pattern, and two-dimensional orthogonal matrices in which a pattern is drawn by variations between spots or group of spots as in a raster scan type image. Various embodiments and methods for creating the same are disclosed.

19 Claims, 6 Drawing Sheets

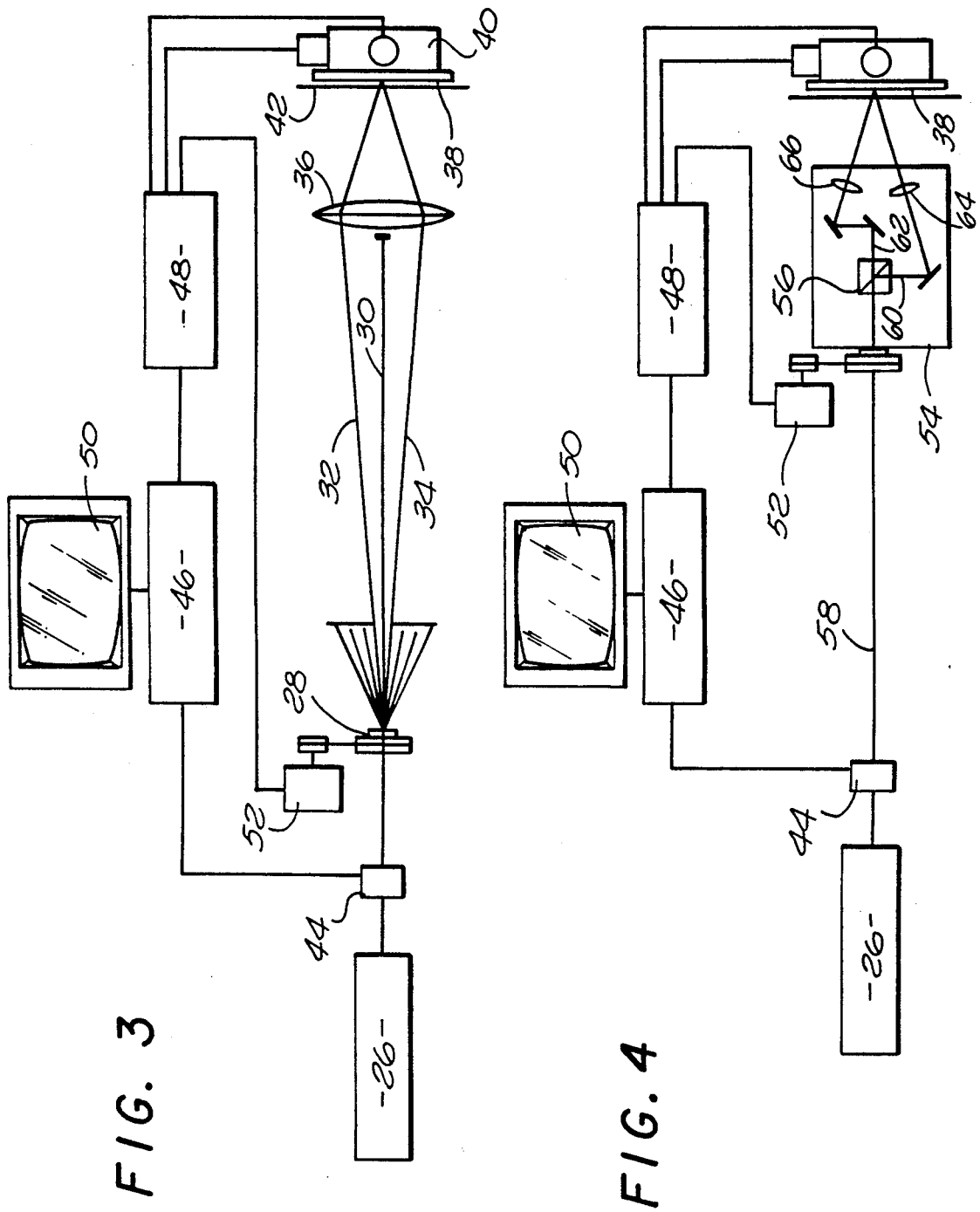

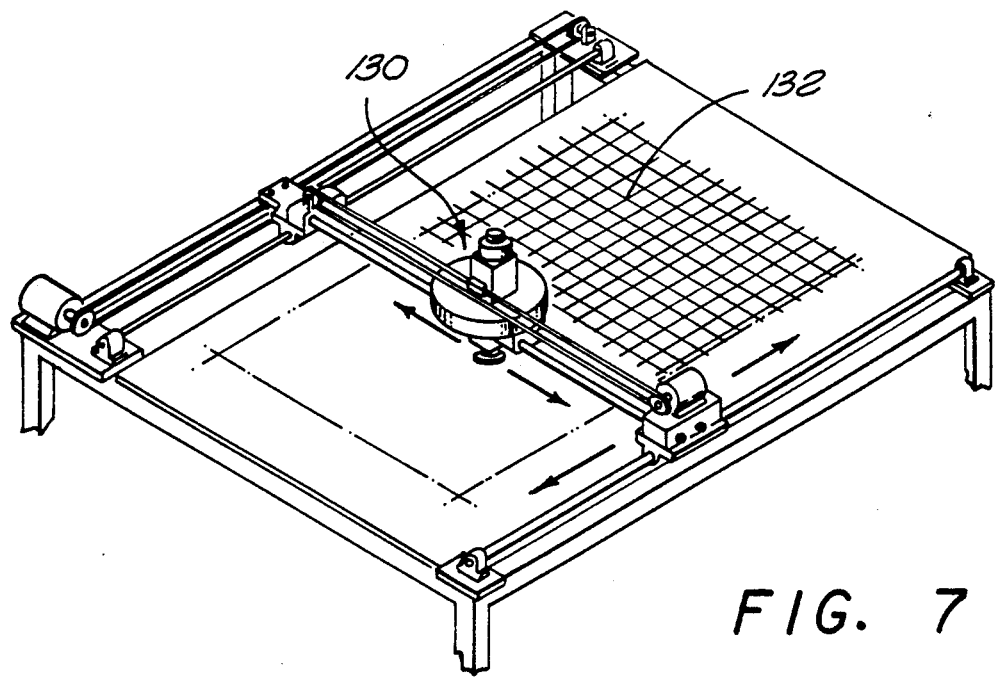
FIG. 7
FIG. 8
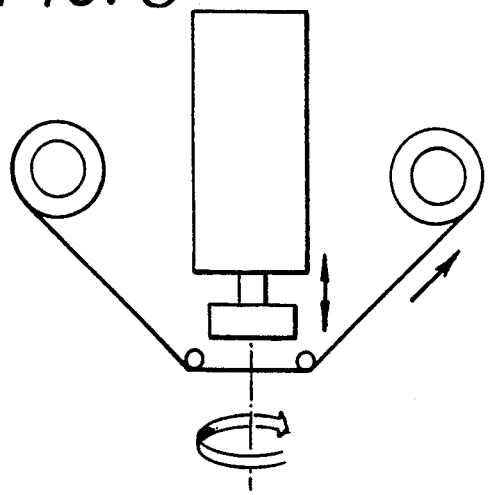
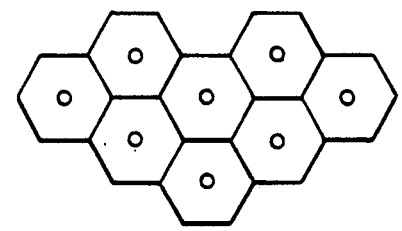
FIG. 9
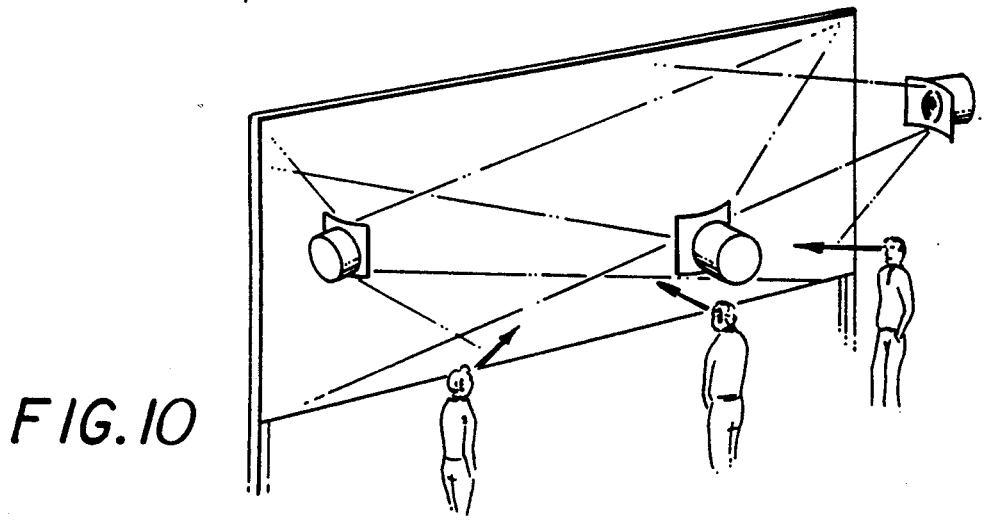
FIG. 10

HOLOGRAPHIC DIFFRACTION GRATING PATTERNS AND METHODS FOR CREATING THE SAME

BACKGROUND OF THE INVENTION

1. Field of the Invention.

The present invention relates to the field of holography, and more particularly to methods and apparatus for creating two-dimensional holographic patterns.

2. Prior Art

Holographic images have been a source of wonder and amusement for a number of years. Holographic images create the impression of a three-dimensional object from the illumination of a two-dimensional hologram. Holographic images have also been used for various practical applications wherein their unique characteristics readily distinguish the same from conventional images. In that regard, probably the best known example at the present time is the holographic image of a dove used on credit cards for authentication purposes. In particular, the advantage of using a hologram to provide a readily recognizable holographic image is that the same is not reproducible by ordinary printing or photographic processes. The difficulty with such holograms, however, is that they are relatively expensive to first produce, and not particularly inexpensive to reproduce in quantity, thereby tending to limit their application for authenticating items to those things of sufficient value to justify the costs involved. In comparison, there are a large number of items of lesser value which, without some similar authenticating marking, are frequently counterfeited and used, to the very substantial loss of the issuer. Such things include tickets and passes of all kinds, including tickets for sporting events, passes for public transportation, etc. In the cases of these examples, the counterfeit copies are offered to a relatively unsophisticated ticket taker or bus driver under circumstances not allowing significant time and attention to evaluate the same, so that the quality of the counterfeit copy need not be that good to have a high likelihood of being accepted. While the addition of color to tickets in past years has helped, the increased popularity of color copiers has more recently offset that gain. If, on the other hand, like the credit card, such items could be authenticated by an appropriate hologram at a reasonable cost, the genuine item would be quickly recognizable by the casual observer, and would be too costly and difficult to reproduce in small quantity for counterfeiting purposes. Further, if the hologram could be changed frequently, such as by way of example changed for each sporting event, or changed monthly for a one month transportation pass, authentication becomes even easier at the time of use of the ticket, pass, etc., and more difficult for the would-be counterfeiter to reproduce.

BRIEF SUMMARY OF THE INVENTION

Methods for creating a plurality of holographic diffraction grating patterns in a raster scan fashion. In accordance with the method, the desired pattern is made up of a large plurality of individual spots, each spot comprising a holographic diffraction grating of a predetermined grating spacing and angular orientation for that spot. Variation of the angular orientation and/or grating spacing between spots and/or groups of spots provide the desired holographic effect. The spot locations may vary as desired, including locations drawing out a desired pattern, and two-dimensional orthogonal matrices in which a pattern is drawn by variations between spots or group of spots as in a raster scan type image. Various embodiments and methods for creating the same are disclosed.

BRIEF DESCRIPTION OF THE DRAWINGS

FIG. 3 is a block diagram of one embodiment of apparatus for forming the holograms of the present invention.

FIG. 4 is a block diagram of an alternate embodiment apparatus for forming the holograms.

FIG. 7 is a schematic representation of an apparatus for forming holograms in accordance with the present invention particularly suited to the formation of relatively large holograms ranging by way of example from poster to billboard size.

FIG. 8 is a schematic representation of an apparatus for forming holograms through the use of diffraction grating transfers.

FIG. 9 is a schematic representation of an alternate spot configuration geometry.

FIG. 10 is a schematic illustration of a billboard size hologram lighted from a plurality of locations.

DETAILED DESCRIPTION OF THE INVENTION

Figure 1:
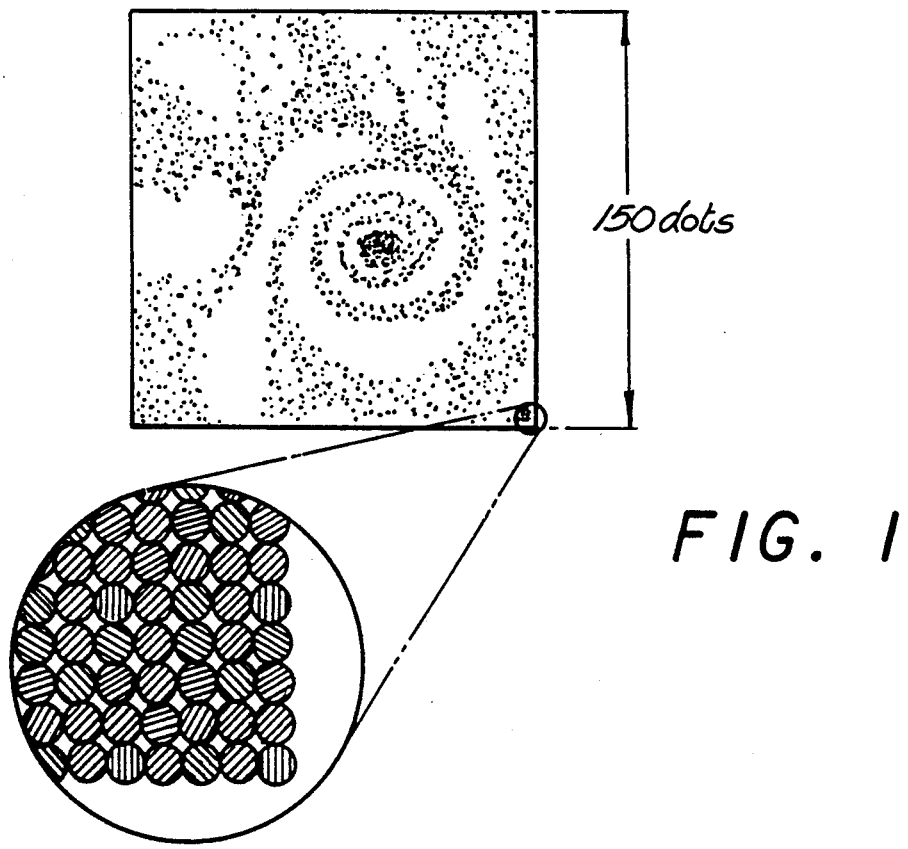
FIG. 1 is a schematic representation of one type of holographic pattern which may be formed by the present invention.

First referring to FIG. 1, a schematic representation of a hologram fabricated in accordance with the present invention may be seen. The pattern illustrated in the Figure is a relatively nongeometric pattern, though is defined by a relatively large plurality of individual spots, each of which is a diffraction grating of a predetermined grating separation and angle with respect to the orthogonal axes of the spot matrix. As illustrated in the Figure, each spot in the entire matrix in this example is comprised of a diffraction grating, with the result that different patterns and characteristics of the hologram will be viewable from different angles when the same is illuminated, typically with white light. Each spot of course will also have a characteristic color which will vary depending upon the angle of the incident illumination and the observer. Obviously, of course, if desired, only specific spots or spot patterns might consist of diffraction gratings, with other areas merely being one or more solid colors or some other form, so that when the same is observed from appropriate angles the design but not the background will appear to have holographic characteristics. Further, of course, if desired, a free form pattern of spots, each of appropriate diffraction grating angle and spacing, may be used rather than the orthogonal spot matrix illustrated, though in general the orthogonal matrix is preferred as being more consistent with computer generation techniques and more readily reproducible by a modified step and repeat process.

Figure 2:
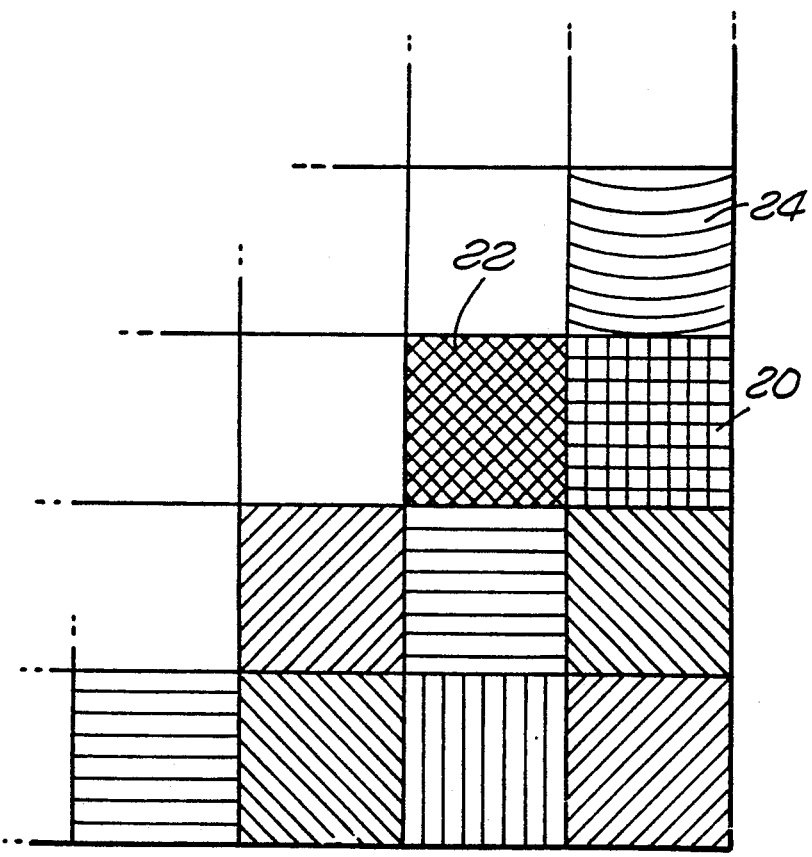
FIG. 2 is a view taken on an expanded scale illustrating the use of rectangular or square spots in the holograms of the present invention.

In FIG. 1, each spot comprises a single circular diffraction grating of parallel, equally spaced grating lines. This is not a limitation of the present invention, however, as spots of other physical geometries, such as, by way of example, square or rectangular geometries as illustrated in FIG. 2 may be used. Here the spots, in essence, totally fill the area involved. The spots as shown are being shown for illustration purposes only and comprise no specific pattern. Also illustrated in FIG. 2, however, are regions 20 and 22, both of which comprise, in essence, an overlay of two diffraction patterns so as to make the spot, when illuminated, visually active from additional angles and/or with other colors. In that regard, while regions 20 and 22 comprise an overlay of diffraction gratings of the same line spacings but with different angles, overlays with the same angle, but different grating spacing and/or with different angles and different spacings of course are readily useable, depending upon the visual effects desired.

Also, if desired, diffraction gratings comprising curved lines to spread the viewing angle of each spot, such as shown in region 24, may also be used within the principles and concepts of the present invention. However, spot sizes normally will be kept sufficiently small so that the effect achievable by overlaying diffraction grating patterns may be substantially achieved by merely placing the two desired patterns side by side in neighboring spot positions, so that in many cases overlaying of patterns will not be necessary. Also, as shall subsequently be seen, certain methods of forming the diffraction grating patterns of the present invention will readily accommodate the use of overlaying patterns of different spacing and/or angles at the same spot location, though other techniques do not lend themselves well to such overlays. Similarly, the extent of curvature one might normally prefer to have within a given spot size usually will effectively be more easily accomplished by using smaller spot sizes and changing the diffraction grating angle between adjacent spots. In any event, it may be appreciated that by using specific spot patterns, a certain pattern may be visible under certain lighting and viewing angle conditions (varying in color as lighting and/or viewing angles change), with another pattern or additional patterns being viewable under other angles of lighting and viewing). Thus, by way of example, for authentication purposes a hologram in accordance with the present invention might be placed on each football game ticket showing from certain angles the date of the game and from other angles the logo of one or both teams, all in a characteristic multi and varying color pattern so as to not be susceptible to unauthorized duplication.

Now referring to FIG. 3, a block diagram of a system for forming a hologram in accordance with the present invention may be seen. As shown therein, a laser 26 directs coherent light to a rotatable head 28 having a diffraction grating mounted therein. The diffraction grating, aside from passing part of the primary or zero order beam 30, diffracts the incoming beam to create the upper and lower first order beams 32 and 34. Beam 30 is blocked by a suitable mask, with beams 32 and 34 being focused to a common point by lens 36 which may be either a glass or a holographic lens. For best performance, the lens should have a small F number, such as, by way of example, in the range of 0.8 to 1.5 so that the two first order beams striking the photosensitive plate 38 are at a sufficient angle to produce a grating with the desired spacing. The photosensitive plate 38 itself is mounted on a motorized X-Y table 40 with the bounds of each spot to be exposed being defined and limited by an aperture plate 42 which may define a round, square, or other shaped spot as desired. Finally, an electronic shutter 44 is provided in the optical path to control the exposure time and, of course, prevent exposure when incrementing the system for the next exposure.

In operation, a computer 46 controls electronic shutter 44 and a three channel servo motor controller 48 to control motor 52 which rotates the diffraction grating 28, and to control the two axis table 40 to successively increment the position of the photosensitive plate 38 from spot location to spot location. In the system shown in the Figure, the angular orientation of the diffraction grating for a spot may be controlled by rotating the head 28 under control of the computer and, of course, exposing the photosensitive plate at a given spot location, with different angle settings of rotating head 28 providing diffraction grating patterns, such as, by way of example, those shown as patterns 20 and 22 in FIG. 2. The system of FIG. 3 will not, however, conveniently allow the variation of the separation of the lines in the diffraction grating, something that can readily be achieved in embodiments hereinafter described.

In operation, computer 46 is used to create the desired pattern, preferably in color on the display 50, each different color representing a different diffraction grating and/or grating angle in accordance with a predetermined relationship or mapping therebetween. Once the desired pattern is created, the print, or expose, operation is initiated. The computer then controls the two axis table 40 to present the first spot position for exposure, rotates head 28 to the desired diffraction grating angle and opens and closes shutter 44 for the exposure of the respective spot. The desired efficiency or brightness of each spot can be controlled by the length of the exposure. If a second grid is to be overlayed on the first, motor 52 is controlled to rotate head 28 to the next desired position and shutter 44 again opened and closed appropriately. Once a given spot has been exposed as desired (typically with a single exposure), table 40 is advanced to the next position, head 28 rotated to the desired angular position for that next spot and shutter 44 again opened and closed appropriately so as to expose the respective spot on the photosensitive plate 38. Obviously, the process may be continued under full control of the computer until the exposure of the photosensitive plate 38 or at least a pattern thereon is complete. Thereafter, the same may be developed and reproduced using, by way of example, any of the commonly used techniques for reproducing holograms in general, including contact printing processes, as well as roller and other embossing processes, hot stamping and the like.

Obviously, from the foregoing it may be seen that the computer control of the system based upon image information first created on the computer will allow the rapid creation and/or alteration of a design without requiring the production of the corresponding three-dimensional object or alternatively the creation of two-dimensional art work by hand. By way of example, the creation of a hologram which will provide the date as one image and a name identifying the event as another image for authentication of tickets to the event could be generated on the computer screen exceedingly fast, and then automatically converted to an actual exposed and developed hologram for subsequent reproduction very efficiently.

Now referring to FIG. 4, an alternate embodiment of the apparatus for exposing the photosensitive plate 38 may be seen. Here instead of using a diffraction grating in the rotating head 28 of FIG. 3 to split the laser beam into two beams (plus a third central beam which is blocked), a rotating head 54 is used, the rotating head having a beam splitter 56 therein for splitting the incoming beam 58 into two beams 60 and 62 which in turn are reflected and pass through lenses 64 and 66 to impinge on the photosensitive plate 38 from opposite sides thereof to form the desired diffraction grating at the angle of the head 54 at the time of the exposure. In general of course, during each exposure it is contemplated that the rotating head 54 be stationary at the desired position, though rotation would appear continuous as the exposure times are sufficiently low.

Figure 5:
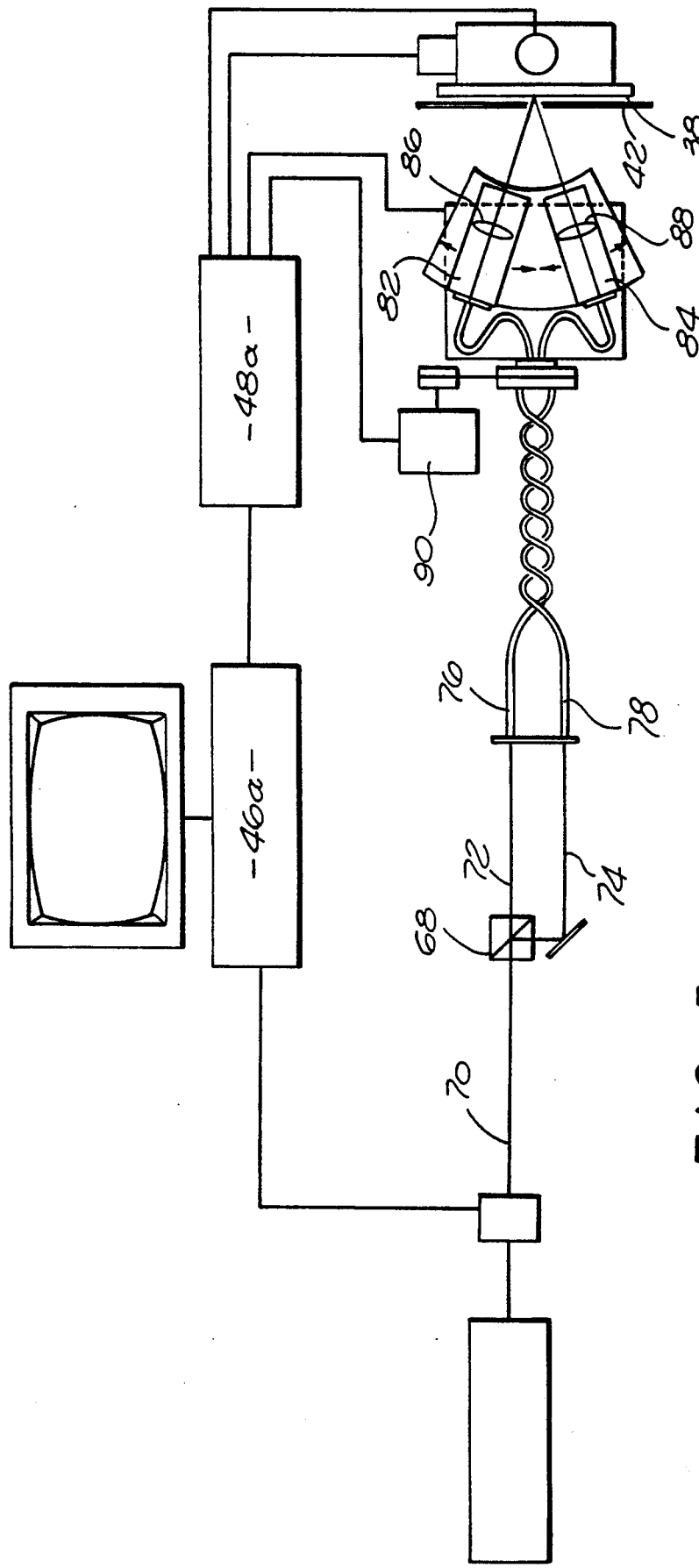
FIG. 5 is a block diagram of a further alternate embodiment apparatus for forming the holograms.

Now referring to FIG. 5, a still further alternate embodiment system for exposing the photosensitive plate 38 may be seen. In this system, a beam splitter 68 splits the original beam 70 into two beams 72 and 74 which are coupled to flexible polarization preserving optical fibers 76 and 78 respectively, coupled to a rotatable head 80. The optical fibers are mechanically coupled to slideable arc segments 82 and 84 so as to each point toward the aperture in plate 42 for exposing a spot on the photosensitive plate 38 therebehind, though are variable in angle with respect thereto under control of controller 48a controlled by computer 46a. In the system, the mirrors are coupled to rotate as required, with the beams being focused as desired by lenses or lens systems 86 and 88. The entire head is rotatable by motor 90 under computer control to control the angle of the diffraction grating, with the control of the position of the sliding assemblies 82 and 84 controlling the angle of the beam portions impinging on a spot and thus controlling the spacing of the lines in the interference pattern created thereon. In that regard, it should be noted that while the angle of both beam portions is shown as being controllable in FIG. 5, normally in unison with each other, the two do not need to be controlled in unison and, in fact, one beam portion may be stationary at some fixed angle with only the other beam portion being controllable to vary the diffraction grating spacing as desired. While the lines of the diffraction grating generated will not be straight if the angles of impingement of the two beam portions are not equal, as with one stationary and one variable angle beam portion, the size of the spot being exposed in comparison to the geometry of the optical system in general will be such that the extent of curvature of the lines of the diffraction grating will normally be fairly minimal.

Figure 6:
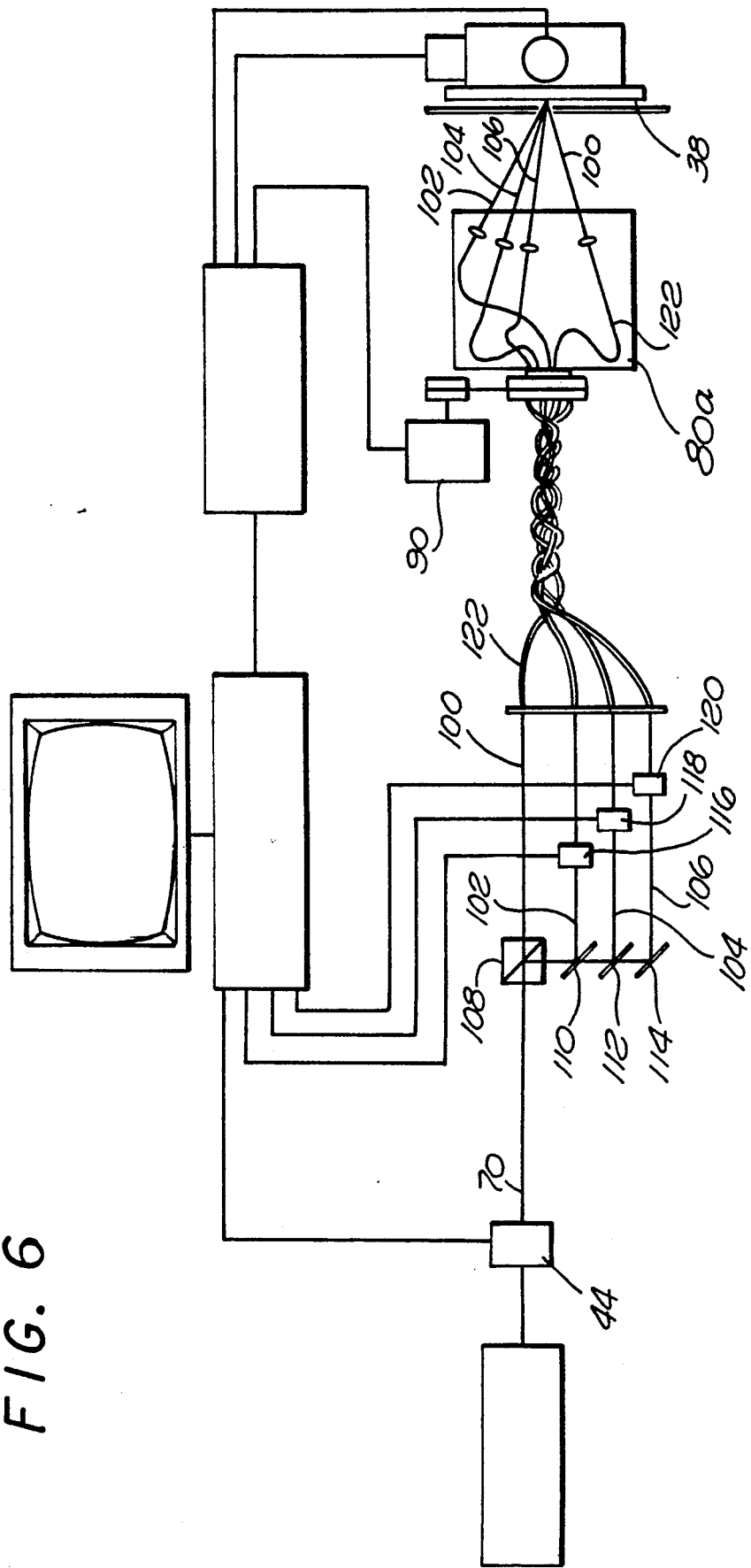
FIG. 6 is block diagram of a still further alternate embodiment apparatus for forming the holograms.

Now referring to FIG. 6, a still further alternate embodiment apparatus for creating the holograms of the present invention may be seen. In this embodiment the beam 70 from the shutter 44 is split into four components 100, 102, 104 and 106 by beam splitters 108, 110 and 112 and mirror 114. Each of the beam components 102, 104 and 106 has an electronically controlled shutter 116, 118 and 120, respectively, in its path. The beam component 100 is applied to optical fiber 122 which forms the reference beam on the spot to be exposed on the photosensitive plate 38. Beam components 102, 104 and 106, if passed by the respective shutters, are applied to the ends of three other optical fibers to selectively provide one or more corresponding beam components at any of three different angles with respect to the spot surface on the photosensitive plate 38. Thus, by way of example, if shutter 116 is first opened and shutters 118 and 120 closed, then upon opening shutter 44, reference beam component 100 together with beam component 102 will provide the interfering beams to generate the diffraction grating at the exposed spot of the photosensitive plate 38. Because of the relatively large angle between beams 100 and 102, the diffraction grating spacing will be relatively small. If instead shutter 118 is open and shutters 116 and 120 are closed when shutter 44 is open, reference beam portion 100 and beam portion 104 will be used, providing a diffraction grating of increased grating spacing with, of course, the use of beam 106 instead of beams 102 and 104, together with beam 100 providing the smallest angle between the two interfering beams and thus the largest grating spacing.

As before, the entire head 80a is rotatable about an axis perpendicular to the photosensitive plate 38 by motor 90 controlled by the computer, preferably in relatively small increments, such as, by way of example, one degree increments. In that regard it should be noted that optical fibers and fiber optic bundles may be made relatively flexible, and because zero and 180 degree positions of a diffraction grating are the same, in the limit only a plus or minus ninety degree rotation range for head 80a is required, though a larger angular range is desirable as the same will allow a look-ahead capability to be used to allow rotation of the head 80a through a minimum angle from exposure to exposure in most cases.

Now referring to FIG. 7, a further alternate embodiment apparatus for creating the holograms of the present invention suitable for the creation of large or very large holograms may be seen. Here a hot stamping head 130 is mounted on an X-Y translation system over a thermoplastic substrate 132 which, by way of example, could be as large as a conventional billboard. In general, the stamping tool would be a temperature controlled, heated tool which could be rotated about its axis through the desired angular variations of the diffraction gratings. If desired, the hot stamping head could include a plurality of such tools for variable grating spacing, rotating the desired tool to the stamping position and the same to the desired angle prior to hot stamping each spot on the thermoplastic substrate. Typically, for very large holograms, spot sizes will be proportionately larger. In such a system the circular spots of FIG. 1 are convenient, or alternatively other shapes could also be used, such as by way of example, the six sided regular polygon so that the same may be interlaced as shown in FIG. 9 to provide a selection of three diffraction grating angles and yet still cover the entire area.

Figure 13:
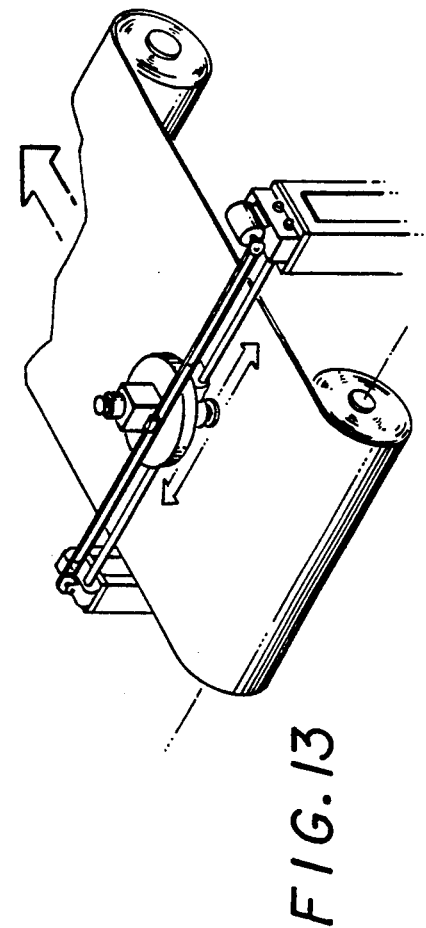
FIG. 13 is a schematic representation of a still further alternate embodiment apparatus for forming the holograms of the present invention.

As an alternative to the system shown in FIG. 7, the thermoplastic substrate 132 may be provided in roll form and transferred line by line between two rolls, with the X-Y drive system of FIG. 7 merely having a lateral drive system, the longitudinal drive effectively being accomplished by advancing the thermoplastic material one spot width after each lateral line of the pattern is formed. This is illustrated in FIG. 13. In that regard, as an alternate to the hot stamping head, the diffraction gratings may be provided as transfers on a tape as illustrated in FIG. 8 and transferred to the substrate at each spot position at the appropriate angle by rotating the transfer tape support and takeup reel, etc. to the appropriate angle before the transfer for each spot is accomplished. Such a transfer technique could be used, by way of example, with the systems of FIGS. 8 and 13. However such a hologram is created, the same will provide an attractive image for billboards whereby a particular group of spots create an image at a specific angle of view and illumination, which will change with the angle of view and/or illumination. For instance a sign might display one message illuminated by the morning sun, another message by the afternoon sun and a still further message when lit at night. Alternatively, a billboard fabricated in accordance with the present invention might be illuminated from three different positions as shown in FIG. 10 so that the people at different positions will see different patterns or messages from the same billboard. Similarly, the lighting might be changed with time so that all patterns could be viewed over a period of time from one position, either by cycling through the lights one by one or by bringing one up slowly as a previous light source fades down so that one message or pattern fades into another, or two complimentary images are viewable at the same time.

Figure 11:
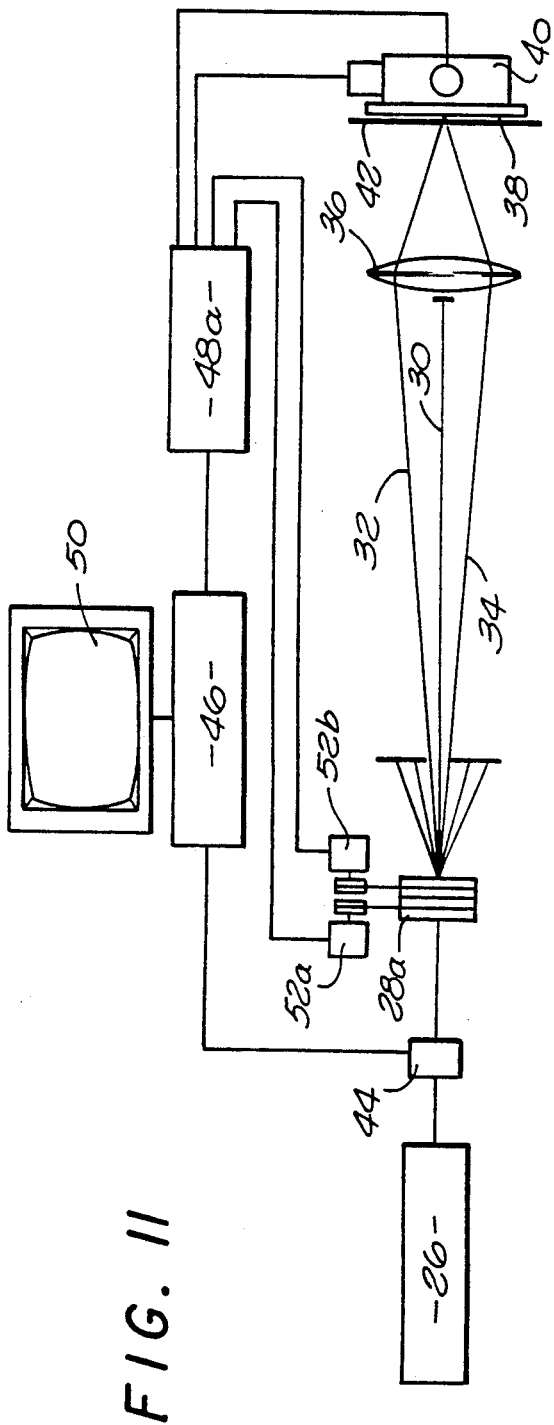
FIG. 11 is a block diagram of an embodiment of the apparatus for forming the hologram of the present invention similar to the apparatus of FIG. 3 but further incorporating the ability to vary the spacing of the diffraction grating as well as the angle thereof.
Figure 12:
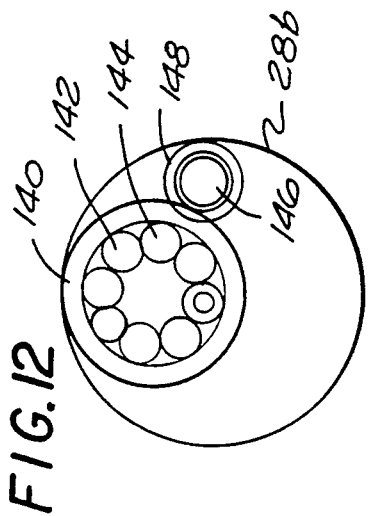
FIG. 12 is a schematic illustration of the apparatus of FIG. 11 for varying the diffraction grating spacing.

Now referring to FIG. 11, an embodiment similar to that of FIG. 3 may be seen, the embodiment of FIG. 11 further including the capability of varying the grating spacing as well as the grating angle. In this embodiment, components which may be substantially identical to those of FIG. 3 and function in the same general manner are identified with the same numerals. However, in this embodiment, instead of a single motor 52 controlled to rotate diffraction grating 28 to the desired angle, two motors 52a and 52b are provided, each controllably rotating members 28a and 28b comprising a variable diffraction grating assembly as shown in FIG. 12. Here a rotating head 140 carries a number of diffraction gratings 142, 144, etc. disposed in a circle therearound, which circle passes through the center or axis of members 28a and 28b. The diffraction grating member 140, eight being shown in the figure, are each of a different grating spacing, for simplicity each being angularly oriented so that rotation of member 140 in angular increments of 45 degrees and multiples thereof will bring a new diffraction grating onto the axis of the assembly, though each with the same angular orientation when so disposed. Schematically illustrated in the figure is a gear 146 driving the periphery of member 140, with a larger gear 148 driven by member 28b (FIG. 11) being connected to and driving gear 146. By proper selection of the gear ratios, a single rotation of member 28b by motor 52b will rotate the diffraction grating member 140 also through a single rotation. A rotation of member 28a by motor 52a, on the other hand, will rotate a member supporting the axes of members 140 and gears 146 and 148. Thus, the rotation of members 28a and 28b in unison will rotate the entire assembly about the optical axis, thereby rotating the diffraction grating which is aligned with the optical axis to any desired angle (Preferably in relatively small increments of, say, 1 degree and multiples thereof). On the other hand, rotation of member 28b in 45 degree increments and multiples thereof without rotation of member 28a will vary the diffraction grating aligned with the optical axis of the system, but not the angle thereof. Thus in the example shown and described, any of eight diffraction gratings may be aligned with the optical axis of the system, with all of them when so aligned being rotatable about the optical axis in relatively small angular increments, such as 1 degree. Obviously, of course, if desired various other schemes might be employed for varying the diffraction grating spacing, such as, by way of example, a drive motor may be provided on the rotatable head for rotating member 140, though such a scheme would require slip rings or some other means of providing power to the rotating assembly. In other cases, however, where only a small number of diffraction grating spacings are desired, such as, by way of example, if only two different spacings are desired, the diffraction grating might slide onto and away from the optical axis of the system under the influence of gravity, this being particularly facilitated by the fact that the diffraction grating angles repeat every 180 degrees rather than every 360 degrees, allowing one grating to be in place over a 180 degree range of head rotation to provide the full grating rotation capability, and the other grating to be in position over the other 180 degree head rotation to provide the full grating angle range for the second grating.

There has been described herein new and unique holographic diffraction grating patterns and methods for creating the same which have many advantages over conventional hologram creation and reproduction techniques. While the holograms of the present invention have been referred to shown and described herein in various places as being orthogonal spot matrices, it is to be understood that the same are not limited to the use of orthogonal matrices or the use of spots defining a pattern which fall on matrix locations of an orthogonal matrix (though such is preferred) but instead may be used to form free-form patterns or even to form spots localized but distinctive and readily recognizable spots of glitter in images of any kind formed by other techniques, such as, by way of example, ordinary printing procedures. Thus, while the present invention has been disclosed and described with respect to certain preferred embodiments thereof, it will be understood by those skilled in the art that various changes in form and detail may be made therein without departing from the spirit and scope thereof.

I claim:

1. A method of forming holographic diffraction grating patterns comprising the steps of:
 (a) providing a member having a photosensitive region thereon;
 (b) generating a pair of beams from a diffraction grating;
 (c) directing said beams with a lens to a spot on said photosensitive region such that a holographic diffraction grating is created within said spot of said photosensitive region; and,
 (d) repeating step (c) a plurality of times for a plurality of spots having different locations on the photosensitive region to define a pattern thereon.

2. The method of claim 1 wherein at least some of the holographic diffraction gratings contain lines that extend in different directions.

3. The method of claim 1 wherein at least some of the holographic diffraction gratings are varied by varying an angle of said beams measured from an axis perpendicular to a surface of the photosensitive region.

4. The method of claim 1 wherein in steps (c) and (d), said holographic diffraction gratings are created in a manner so as to trace out a specific decorative pattern.

5. The method of claim 1 wherein in steps (c) and (d), the holographic diffraction gratings are created in a raster scan pattern.

6. The method of claim 1 wherein the spots are round.

7. The method of claim 1 wherein the spots are polygonal.

8. The method of claim 1 wherein in steps (c) and (d), the length of exposure of said beams is varied between at least some spots.

9. A method of forming holographic diffraction grating patterns, comprising the steps of:
  a) directing a beam of light through a diffraction grating to create a pair of pattern beams;
  b) focusing said pattern beams onto a first spot of a photosensitive member such that a holographic diffraction grating is created onto said first spot of said photosensitive member;
  c) moving said photosensitive member such that a second spot can be exposed to said pattern beams;
  d) rotating said diffraction grating; and
  e) directing a beam of light through said diffraction grating, to create a pair of pattern beams which are focused onto said photosensitive member such that a second holographic diffraction grating is created onto said second spot.

10. The method of claim 9 wherein said diffraction grating is rotated so that said first spot has lines that extend in a different direction from lines in said second spot.

11. The method of claim 9 wherein the holographic diffraction grating is varied between the first spot and the second spot by varying an angle of said beams measured from an axis perpendicular to a surface of the photosensitive region.

12. The method of claim 9 wherein the holographic diffraction grating is varied between the first spot and the second spot by varying the spacing of the lines of the diffraction grating.

13. The method of claim 9 wherein the holographic diffraction grating is varied between the first spot and the second spot by varying the angle thereof about an axis perpendicular to the local surface of the photosensitive region and at the same or other times varying the spacing of the lines of the diffraction grating.

14. The method of claim 9 wherein the holographic diffraction gratings are created in a predetermined manner.

15. The method of claim 9 wherein steps (c) through (e) are repeated in a number of times such that the spots trace out a specific decorative pattern.

16. The method of claim 9 wherein the spots are impressed in a raster scan pattern.

17. The method of claim 9 wherein the spots are round.

18. The method of claim 9 wherein the spots are polygonal.

19. The method of claim 9 wherein the length of exposure of said beams is varied between the first and second spots spots.

* * * * *